United States Patent [19]

Melvin, II

[11] Patent Number: 5,675,074

[45] Date of Patent: Oct. 7, 1997

[54] ANALYZING INTERNAL PRESSURE OF A CLOSED CONTAINER

[75] Inventor: Robert G. Melvin, II, Sandwich, Mass.

[73] Assignee: Benthos, Inc., North Falmouth, Mass.

[21] Appl. No.: 586,490

[22] Filed: Jan. 16, 1996

[51] Int. Cl.$^6$ .................................................. G01M 3/00
[52] U.S. Cl. .................................................. 73/52; 73/49.3
[58] Field of Search .................................................. 73/52, 49.3

[56] References Cited

U.S. PATENT DOCUMENTS

| | | | |
|---|---|---|---|
| 1,956,301 | 4/1934 | Richardson | 73/51 |
| 2,320,390 | 6/1943 | Shmurak | 73/51 |
| 3,290,922 | 12/1966 | Thompson | 73/52 |
| 3,416,360 | 12/1968 | Ochs | 73/52 |
| 3,441,132 | 4/1969 | Browning | 209/72 |
| 3,802,252 | 4/1974 | Hayward et al. | 73/52 |
| 4,096,738 | 6/1978 | Rupp et al. | 73/52 |
| 4,187,718 | 2/1980 | Shibaski | 73/52 |
| 4,223,790 | 9/1980 | Yoshida | 73/41 |
| 4,406,157 | 9/1983 | Miyahara et al. | 73/52 |
| 5,144,838 | 9/1992 | Tsuboi | 73/579 |
| 5,161,521 | 11/1992 | Kasahara et al. | 128/24 AA |
| 5,353,631 | 10/1994 | Woringer et al. | 73/52 |

FOREIGN PATENT DOCUMENTS

| | | |
|---|---|---|
| 40 04 965 | 9/1991 | Germany. |
| 3-156336 | 7/1991 | Japan. |

OTHER PUBLICATIONS

*Canner Packer*, "Food Technology", Jan., 1972, p. 29 et al.

Kelsey, R., *Food and Drug Packaging*, Nov., 1990, p. 8.

Arthur D. Little Decision Resources, "Advances In Rapid Testing For Food—Industry Report", Jul. 12, 1990.

U.E. Systems, News Release, "New Line of Dedicated Systems For Leak Detection", Jul. 31, 1986.

*Primary Examiner*—Hezron E. Williams
*Assistant Examiner*—Jay L. Politzer
*Attorney, Agent, or Firm*—Fish & Richardson, P.C.

[57] ABSTRACT

A method of analyzing internal pressure of a closed container includes inducing vibration in a surface of a closed container; detecting sound resulting from the vibration; deriving information representing the detected sound; and determining whether the information corresponds to a predetermined spectral frequency condition and a predetermined spectral amplitude condition. The surface is at least partially conductive and inducing includes imposing a magnetic field on the surface. The predetermined spectral frequency condition and the predetermined spectral amplitude condition correspond to ranges of acceptable values. The detected sound is used to determine whether the closed container contains a pressure level within a predetermined range of pressure levels.

30 Claims, 10 Drawing Sheets

ANALYZING INTERNAL PRESSURE OF A CLOSED CONTAINER

BACKGROUND

This invention relates to characterizing the internal pressure of a closed container.

Food, beverage, and drug containers, for example, are often sealed under vacuum (e.g., coffee) or internal pressurization (e.g., beer). If biological contamination or seal failure occurs, the product quality may be significantly degraded and may be dangerous to consumers. Accordingly, manufacturers test the internal pressure/vacuum of containers before shipment to identify and remove defective containers.

Two non-intrusive testing techniques are shown in Hayward, U.S. Pat. No. 3,802,252 and Woringer, U.S. Pat. No. 5,353,631, both assigned to Benthos™, Inc., and incorporated by reference. Systems of this type have been sold under the name TapTone™. In both cases, the system vibrates a conductive surface of a container, without contacting it, using a pulsed magnetic field and the resulting sound is analyzed to determine the pressure in the container. A microphone senses the resulting acoustic energy and converts it into an electrical signal. In the Hayward scheme, analog electronics are used to determine whether the signal has a detectable level of energy within a pre-tuned frequency band. If a signal is detected, it is inferred that the can is good. In the Woringer scheme, a similar test is performed using digital signal processing (DSP) electronics and software.

SUMMARY

In general, in one aspect, the invention features a method including inducing vibration in a surface of a closed container, detecting sound resulting from the vibration, and deriving information representing the detected sound. The method further includes determining whether the information corresponds to a predetermined spectral frequency condition and a predetermined spectral amplitude condition.

Implementations of the invention may include one or more of the following. The surface may be at least partially conductive, and inducing may include imposing a magnetic field on the surface. Determining may include comparing the information to the predetermined spectral frequency and spectral amplitude conditions which may correspond to ranges of acceptable values. The information may include digital data and may represent a frequency spectrum peak. The predetermined spectral frequency and spectral amplitude conditions may define a good or a bad container region, and determining may include comparing the frequency and the amplitude of a spectral frequency peak to the good or bad container region. The detected sound may be used to determine whether the closed container contains a pressure level within a predetermined range of pressure levels.

In general, in another aspect, the invention features a method including inducing vibration in a surface of a closed container by imposing a magnetic field on the surface, detecting sound resulting from the vibration, and deriving information representing the detected sound. The method further includes determining whether the data corresponds to a predetermined frequency condition and a predetermined amplitude condition. The predetermined frequency condition corresponds to a range of acceptable frequencies, and the predetermined amplitude condition corresponds to a minimum or a maximum amplitude threshold. Determining includes comparing the data to the range of acceptable frequencies and to the amplitude thresholds.

In general, in another aspect, the invention features a method of operating a manufacturing line, including passing closed containers through a container inspection system and, at the container inspection system, inducing vibration in a surface of each of the closed containers, detecting sound resulting from the vibration, and deriving information representing the detected sound. The method further includes determining whether the information corresponds to a predetermined spectral frequency condition and a predetermined spectral amplitude condition.

Implementations of the invention may include one or more of the following. Inducing may include imposing a magnetic field on the surface of each of the closed containers, and determining may include comparing the information to the predetermined spectral frequency and spectral amplitude conditions. The information may represent a spectral frequency peak.

The predetermined spectral frequency and spectral amplitude conditions may define a good container region, and determining may include comparing the frequency and the amplitude of a spectral frequency peak to the good container region. Containers may be rejected or accepted based on the results of the determining step. For instance, containers with associated frequency peaks that are outside the good container region may be rejected, while containers with associated frequency peaks that are within the good container region are accepted. Containers with associated spectral frequency peaks that are outside a range of acceptable frequencies may be rejected as well as containers with associated spectral frequency peaks that are within a range of acceptable frequencies but which have amplitudes below a minimum amplitude threshold or above a maximum amplitude threshold. Rejected containers may contain a pressure level below a predetermined range of acceptable pressure levels.

The predetermined spectral frequency condition and the predetermined spectral amplitude condition may define a bad container region, and determining may include comparing the frequency and the amplitude of a spectral frequency peak to the bad container region. Containers with associated spectral frequency peaks that are within the bad container region may be rejected while containers with associated spectral frequency peaks that are outside the bad container region may be accepted.

In general, in another aspect, the invention features a container inspection system for use with a closed container including an electromagnetic field source for inducing vibration in a surface of the container. The surface is at least partially conductive. The inspection system also includes an acoustic transducer for measuring reactant sound produced by the vibration, and a controller electrically connected to the acoustic transducer, for detecting a frequency peak within the reactant sound and for comparing the frequency peak to a good container region. The good container region is defined by a predetermined frequency condition and a predetermined amplitude condition.

Implementations of the invention may include one or more of the following. The container inspection system may further include a rejecting station for rejecting containers with associated spectral frequency peaks outside the good container region. The predetermined frequency condition may include a range of frequencies, and the predetermined amplitude condition may include a minimum amplitude threshold and a maximum amplitude threshold. The rejecting station may reject containers with associated frequency peaks outside the predetermined range of acceptable frequencies and containers with associated frequency peaks within the predetermined range of acceptable frequencies and having an amplitude below the minimum amplitude threshold or above the maximum amplitude threshold. The controller may include a digital signal processor for receiving and performing a fast fourier transform on electrical signals from the acoustic detection device to provide the signal spectral characteristics. The acoustic transducer may include a microphone, and the electromagnetic field source may include a conductive coil. The container inspection system may further include a conveyor belt for carrying the containers through the inspection system and a rotary position encoder connected to a drive shaft of the conveyor belt and to the controller. The detector may be used to detect changes in the pressure level contained by the container.

In general, in another aspect, the invention features a container inspection system for use with a closed container including an electromagnetic field source for inducing vibration in a surface of the container. The surface is at least partially conductive. The container inspection system further includes an acoustic detection device for detecting reactant sound produced by the container in response to the imposition of the magnetic field, and a controller electrically connected to the acoustic detection device, for detecting a spectral frequency peak within the reactant sound and for comparing the frequency peak to a bad container region. The bad container region is defined by a predetermined frequency condition and a predetermined amplitude condition.

Implementations of the invention may include one or more of the following. The container inspection system may further include a rejecting station for rejecting containers with associated spectral frequency peaks within the bad container region. The predetermined frequency condition may include a range of frequencies, and the predetermined amplitude condition may include a minimum amplitude threshold and a maximum amplitude threshold. The controller may include a digital signal processor for receiving and performing a fast fourier transform on electrical signals from the acoustic transducer.

In general, in another aspect, the invention features an apparatus for analyzing internal pressure of a closed container including a conductive coil for inducing vibration in a surface of the container where the surface is at least partially conductive. The apparatus also includes circuitry for deriving a frequency versus amplitude spectrum of the vibration, digital storage for holding the spectrum and for holding data sufficient to analyze the internal pressure based on the spectrum, and a processor for analyzing the internal pressure based on the spectrum and the data.

Implementations of the invention may include one or more of the following. The processor may include means for analyzing the internal pressure based on the frequency and amplitude of a peak of the spectrum.

In general, in another aspect, the invention features an apparatus for analyzing internal pressure of a series of closed containers moving along a manufacturing line including a conductive coil for inducing vibration in a surface of the container where the surface is at least partially conductive. The apparatus further includes an analyzer for deriving a frequency versus amplitude spectrum of the vibration, digital storage for holding the spectrum and data sufficient to analyze the internal pressure based on the spectrum, and a processor for generating the data. The processor including means for energizing the coil and controlling the analyzer to generate frequency versus amplitude spectra for vibrations of a series of test containers having different, known internal pressures, and means for deriving the data from the spectra.

In general, in another aspect, the invention features an apparatus for analyzing internal pressure of a closed container including a conductive coil for inducing vibration in a surface of the container where the surface is at least partially conductive and a sensor for detecting the vibration. The apparatus further includes storage for holding time domain data corresponding to the vibration, circuitry for deriving a frequency versus amplitude spectrum from the time domain data, and a display for showing a two-dimensional graphic image of the spectrum.

Rapid, accurate determinations of the internal pressure/vacuum of a variety of containers, including cans, pop top bottles, and vacuum packed foil bags, are made by analyzing the acoustic response of a closed container using both frequency and minimum and maximum amplitudes of the acoustic spectral content. Improperly pressurized or vacuumed containers are detected because the amplitude of a frequency peak in the container's reactant sound is too high or too low when the frequency of the peak is within a selected frequency range.

A rotary position (shaft) encoder provides a controller with the current speed of the manufacturing line. Using both the shaft encoder and a photobeam assembly, the controller accurately locates the positions of containers as they pass through the inspection system and matches collected data to the positions of containers. Accurate matching, improves the detection of defective cans. Additionally, with an accurate determination of a defective can's position, the controller may reliably cause a rejection station to remove the defective can from the manufacturing line.

Other advantages and features will become apparent from the following description, and from the claims.

DESCRIPTION

Often, containers being filled and sealed in a manufacturing line are defective due to improper seals or contamination. An improper seal may prevent a container from maintaining a proper vacuum or pressure. Contamination may cause excessive pressure within the container due to outgasses produced by bacteria as the material spoils. To detect improperly pressurized/vacuumed containers, a pulsed magnetic field is imposed on a conductive surface of the container to cause the surface to vibrate, and the acoustic response (i.e., reactant sound) caused by the vibration is analyzed.

The analysis begins by finding a frequency peak within the reactant sound and determining whether the frequency of that peak is within a predetermined frequency range. Certain containers, for example, pop top bottles and vacuum packed foil bags, may be improperly pressurized/vacuumed or improperly capped but still produce a reactant sound including a frequency peak within the predetermined frequency range. Analyzing the frequency of the frequency peak alone, therefore, may not allow for the detection of all defective containers.

The amplitude of a frequency peak corresponding to an improperly pressurized/vacuumed container is generally much lower than the amplitude of a frequency peak corresponding to a properly pressurized/vacuumed container. Similarly, the amplitude of a frequency peak corresponding to an improperly capped container is generally much higher than the amplitude of a frequency peak corresponding to a properly capped container. For example, beer bottles that are "double crowned" (i.e., capped twice) may produce a reactant sound including a frequency peak with a very large amplitude. To detect these defective containers, the amplitude of the frequency peak is compared to minimum and maximum amplitude thresholds and the container is rejected if the amplitude falls below the minimum amplitude threshold or exceeds the maximum amplitude threshold.

Figure 1:
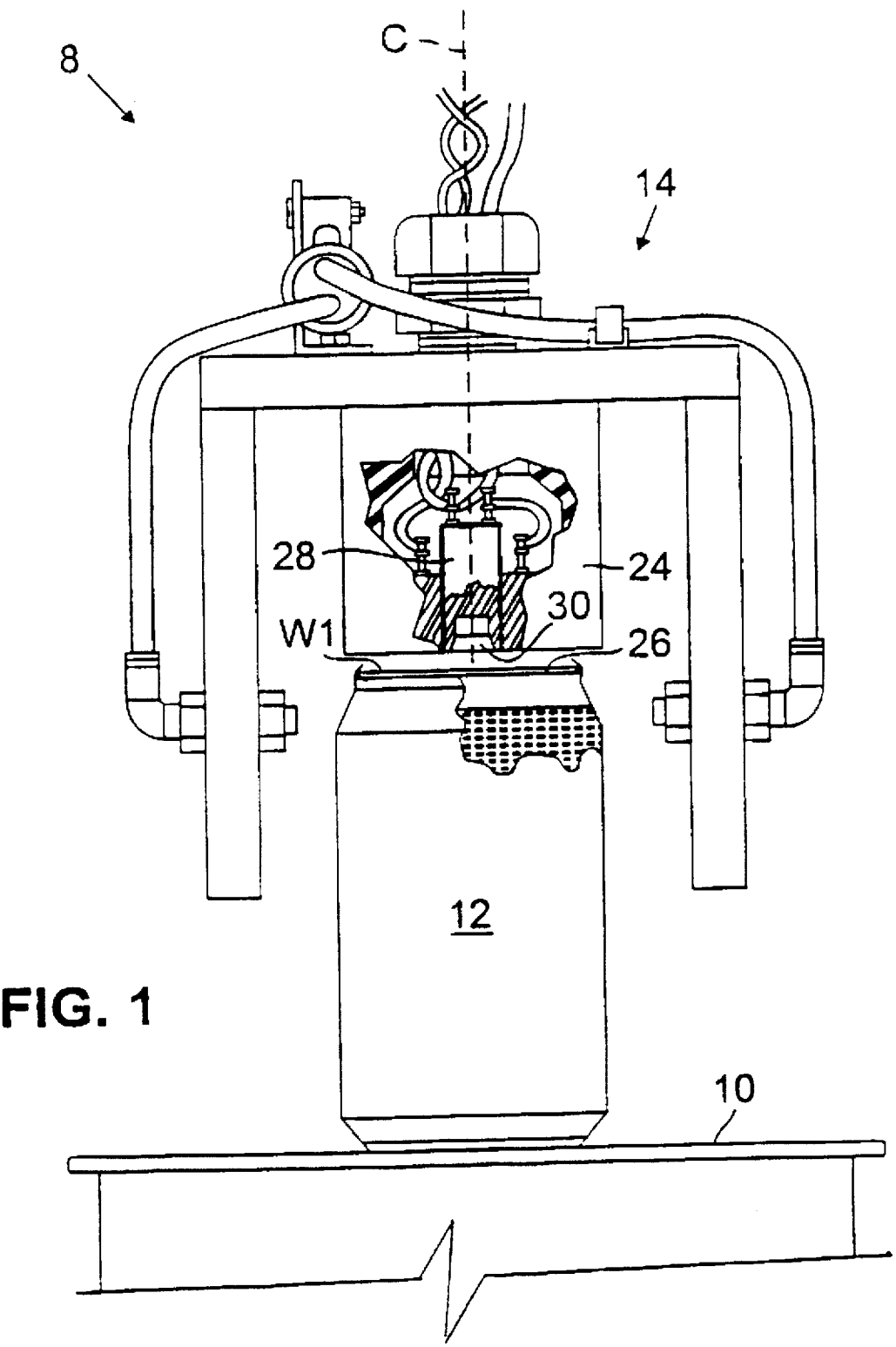
FIG. 1 is a side view partly broken away of a transducer station.
Figure 2:
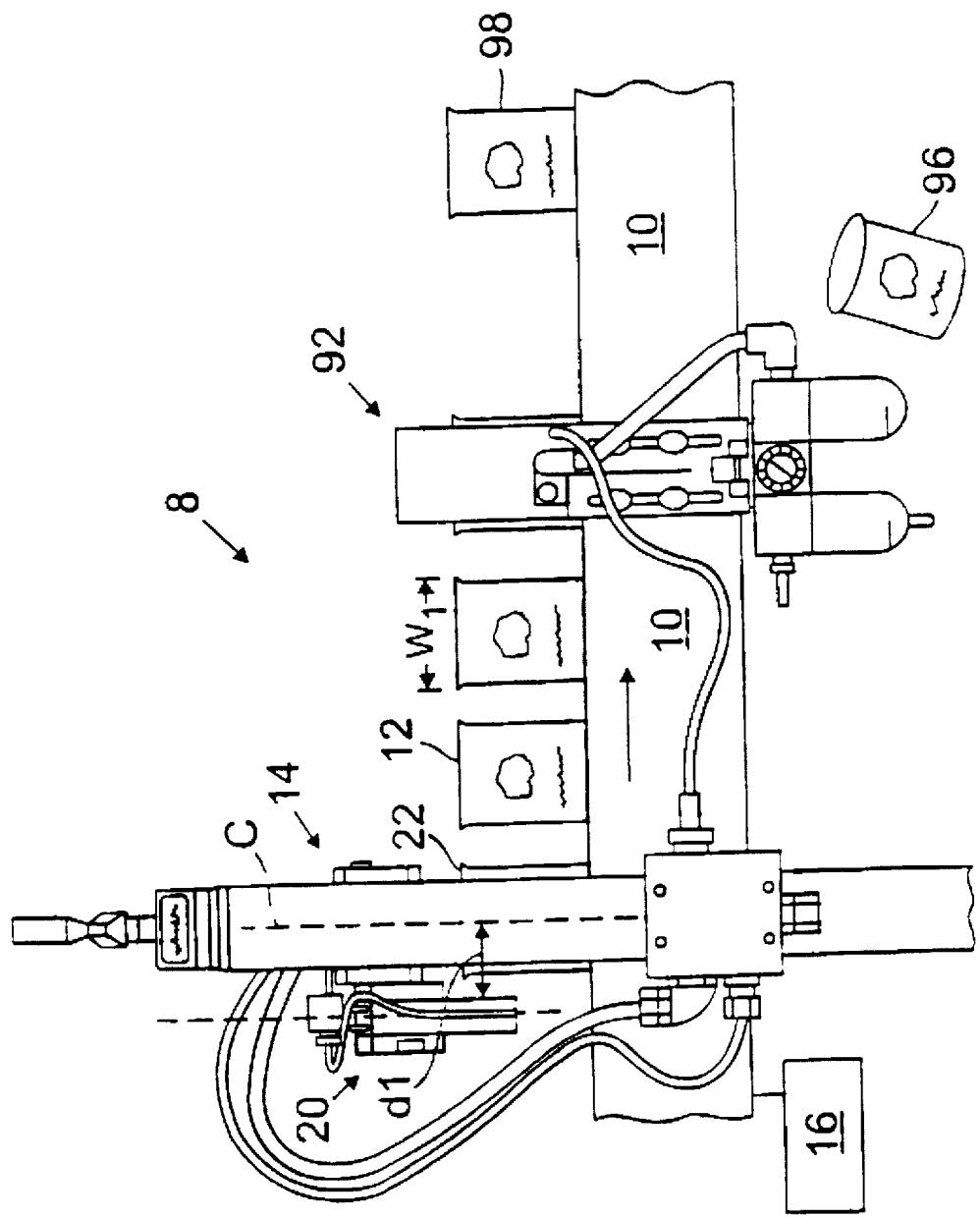
FIG. 2 is a side view of the transducer station of FIG. 1 and a rejector station.
Figure 3:
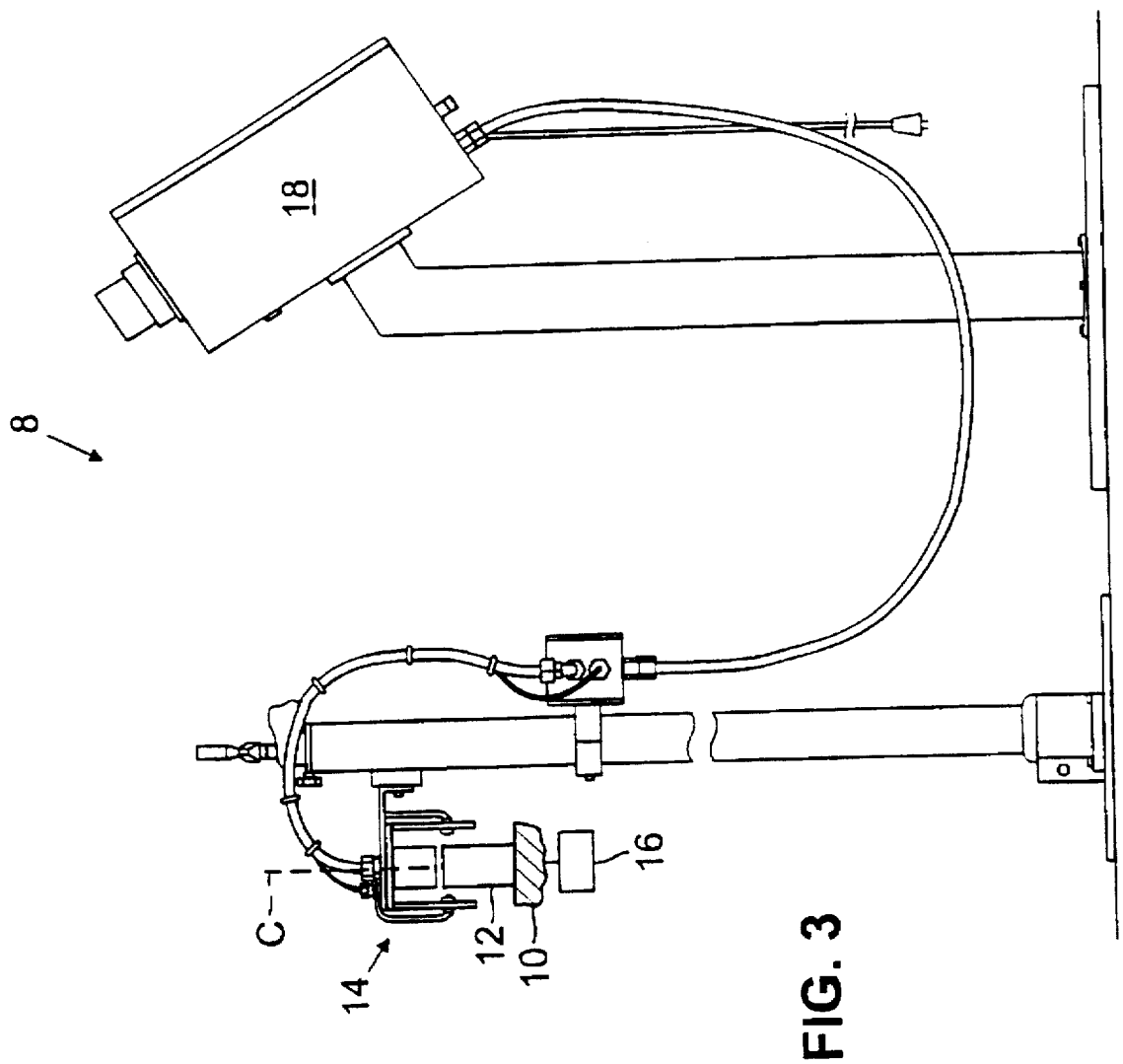
FIG. 3 is an end view of the transducer station of FIG. 1 and a controller.

Referring to FIGS. 1–3, an inspection system 8 includes a conveyor belt 10 that carries closed containers 12 through a transducer station 14 at approximately 3000 containers per minute. A rotary position (shaft) encoder 16 is connected to a drive shaft (not shown) of the conveyor belt and provides a controller 18 with an accurate measurement of the current speed of the conveyor belt. As a container approaches the transducer station, a photobeam assembly 20 detects an edge 22 of the container and sends a notification signal to the controller. Upon notification, the controller uses the speed of the conveyor belt, the fixed distance d1 between the photobeam assembly and the transducer station, and the width W1 of the container to calculate the position of the container with respect to the center C of the transducer station.

When the container is centered beneath the transducer station, the controller sends a signal to the transducer station to cause the station to discharge a capacitor (not shown) through a coil 24. The coil is formed from a closely wound copper tape with a teflon backing. The coil is placed in a phenolic form and potted with an epoxy. The discharge produces a pulsed magnetic field which induces eddy currents on a conductive surface 26 of the container. The eddy currents generate a back electromagnetic force (the principle of the induction motor) causing the conductive surface to vibrate. The vibration is influenced by the pressure/vacuum within the container. A microphone 28, centered within coil 24 senses the acoustic energy (i.e., reactant sound) resulting from the vibration and converts it into a time-varying analog electrical signal which is sent to the controller.

The microphone and coil are positioned above a cone 30 to prevent them from being contaminated. Contamination may result from water droplets on container tops and from fluid used to clean the manufacturing line.

The photobeam assembly may be a mini-beam model No. SM312FMHS manufactured by Banner of Minneapolis, Minn. The shaft encoder may be a model No. 62525400021 manufactured by Dynapar of Gurnee, Ill., and the microphone may be a model No. 3140 manufactured by Gentex of Derry, N.H.

Figure 4:
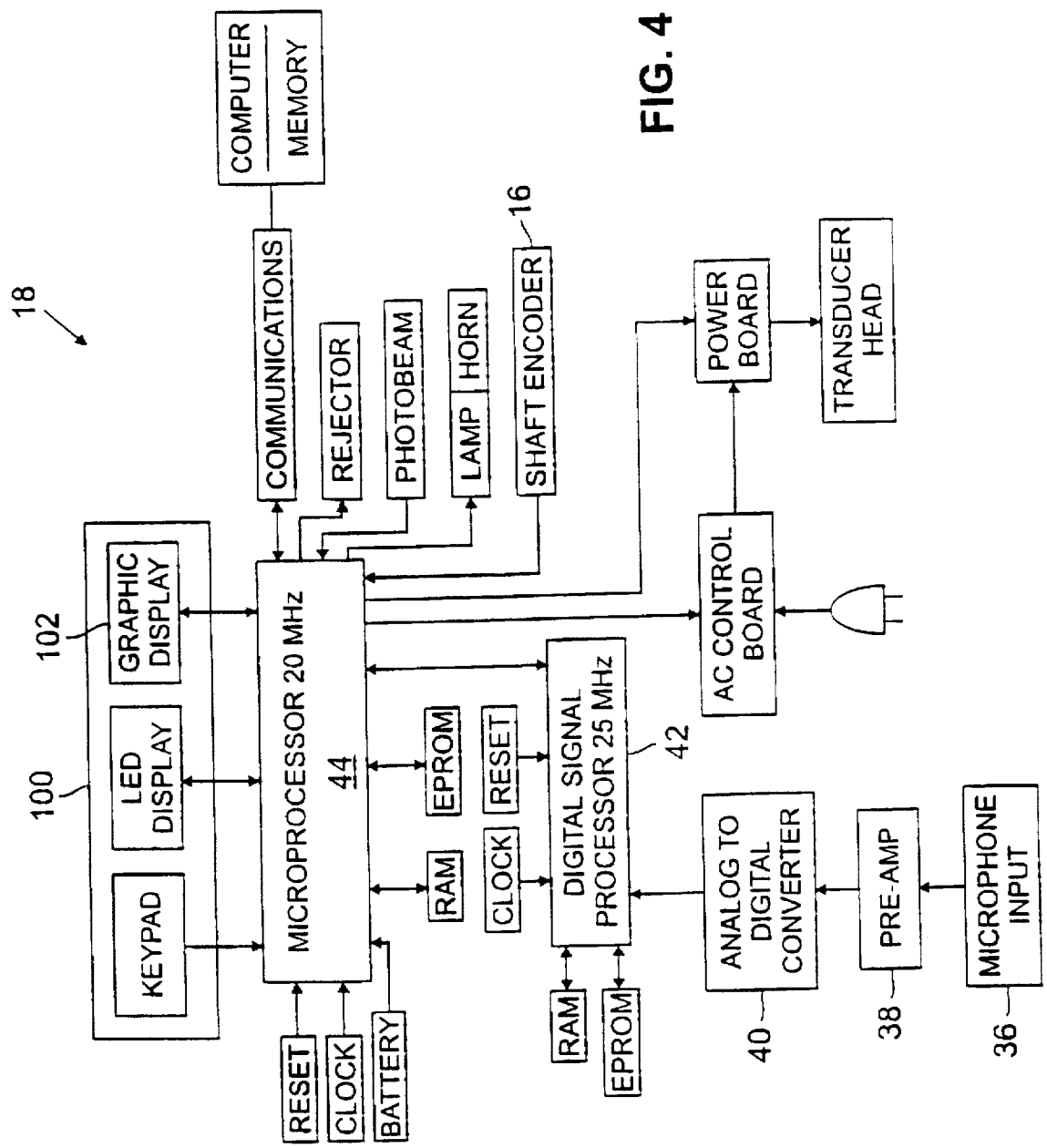
FIG. 4 is a block diagram of the components of the controller of FIG. 3.

Referring to FIG. 4, a microphone input 36 within the controller receives the output signal from the microphone and passes the signal to a pre-amplifier 38. An analog-to-digital (A/D) converter 40 digitizes the preamplifier's output every 45 microseconds, and a digital signal processor (DSP) 42 stores the A/D converter's digital output. The DSP performs fast fourier transforms (FFT) on the samples to produce a power spectrum of approximately 512 bins (0–511) with the lower bin numbers corresponding to lower frequencies. The DSP then analyzes the power spectrum to determine the frequency and amplitude of the maximum frequency peak within the spectrum.

To determine the maximum frequency peak, the DSP compares each bin value within the power spectrum to the next lower and higher bins in frequency. If both the lower and higher bins have values that are less than the value of the bin being considered, then the bin represents a peak. After finding a peak, if the DSP finds another peak within the spectrum, it compares the amplitude of both peaks and stores the frequency and amplitude of the peak with the highest amplitude. Once the DSP has checked the FFT value of each bin within the power spectrum, the frequency and amplitude of the peak with the highest amplitude is sent to a microprocessor 44 for further evaluation. If no peak is found, then the DSP sends an error code to the microprocessor.

Figure 5A:
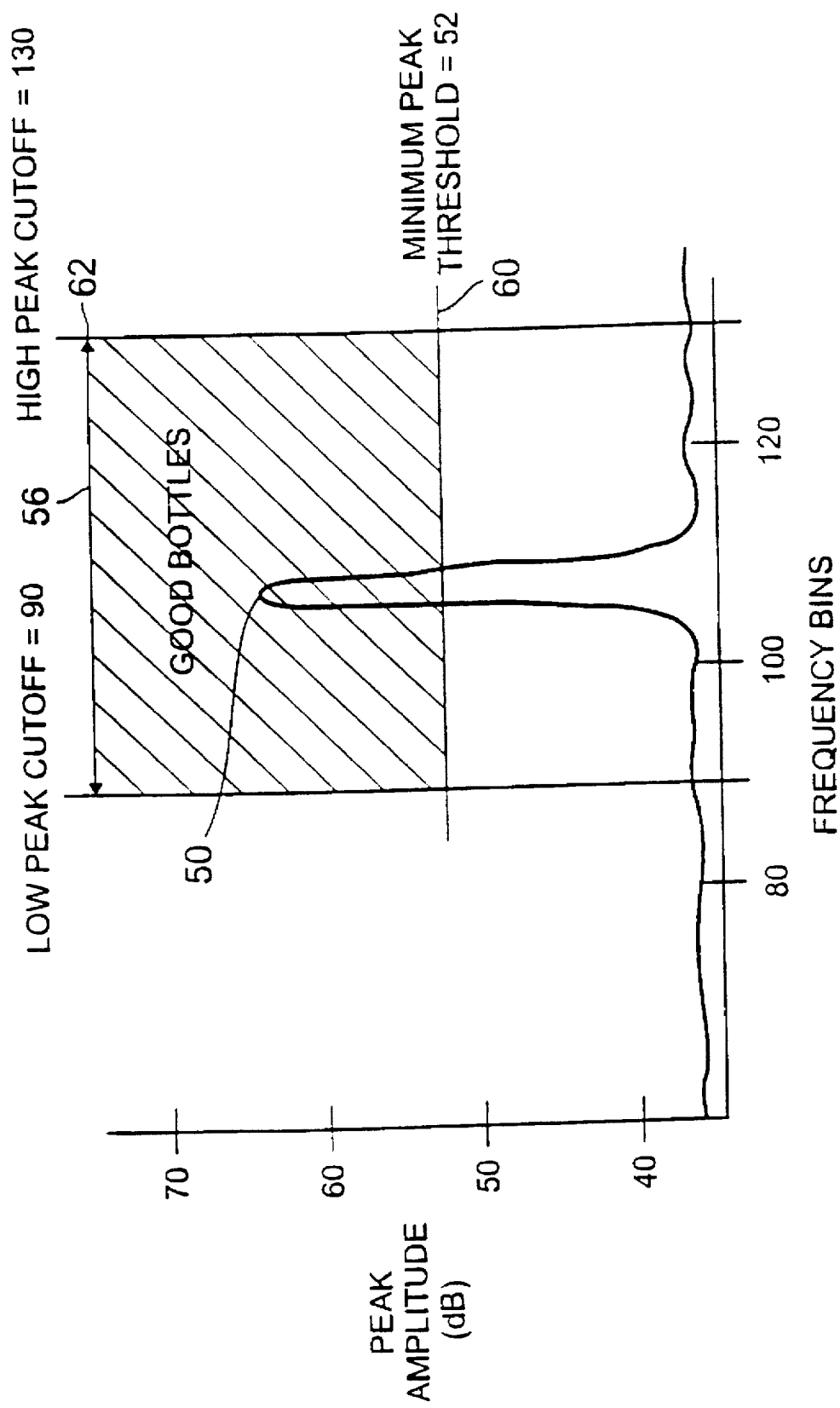
FIGS. 5a–5c are frequency domain graphs of pop top bottle acoustic responses for different internal vacuums.
Figure 5B:
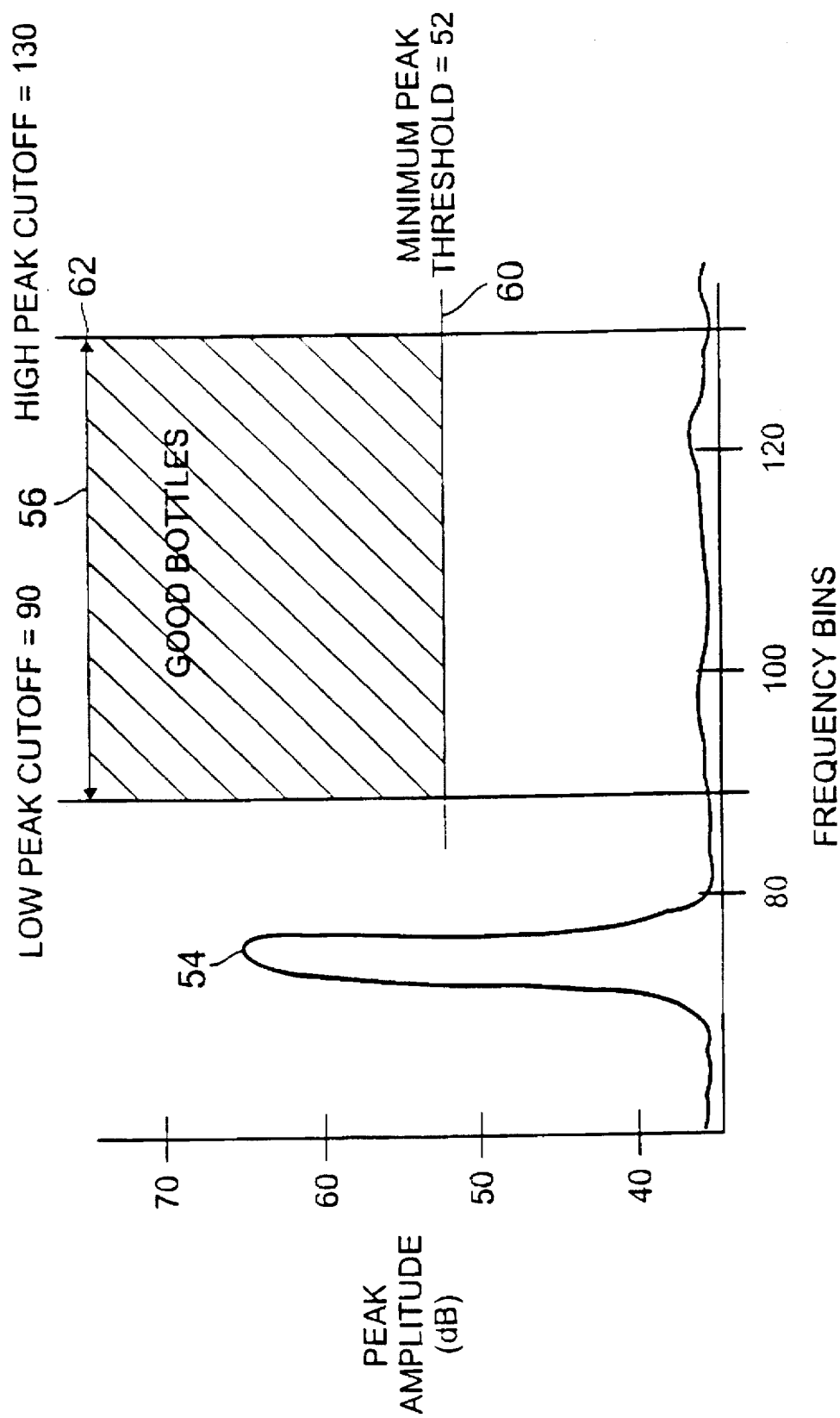
Figure 5C:
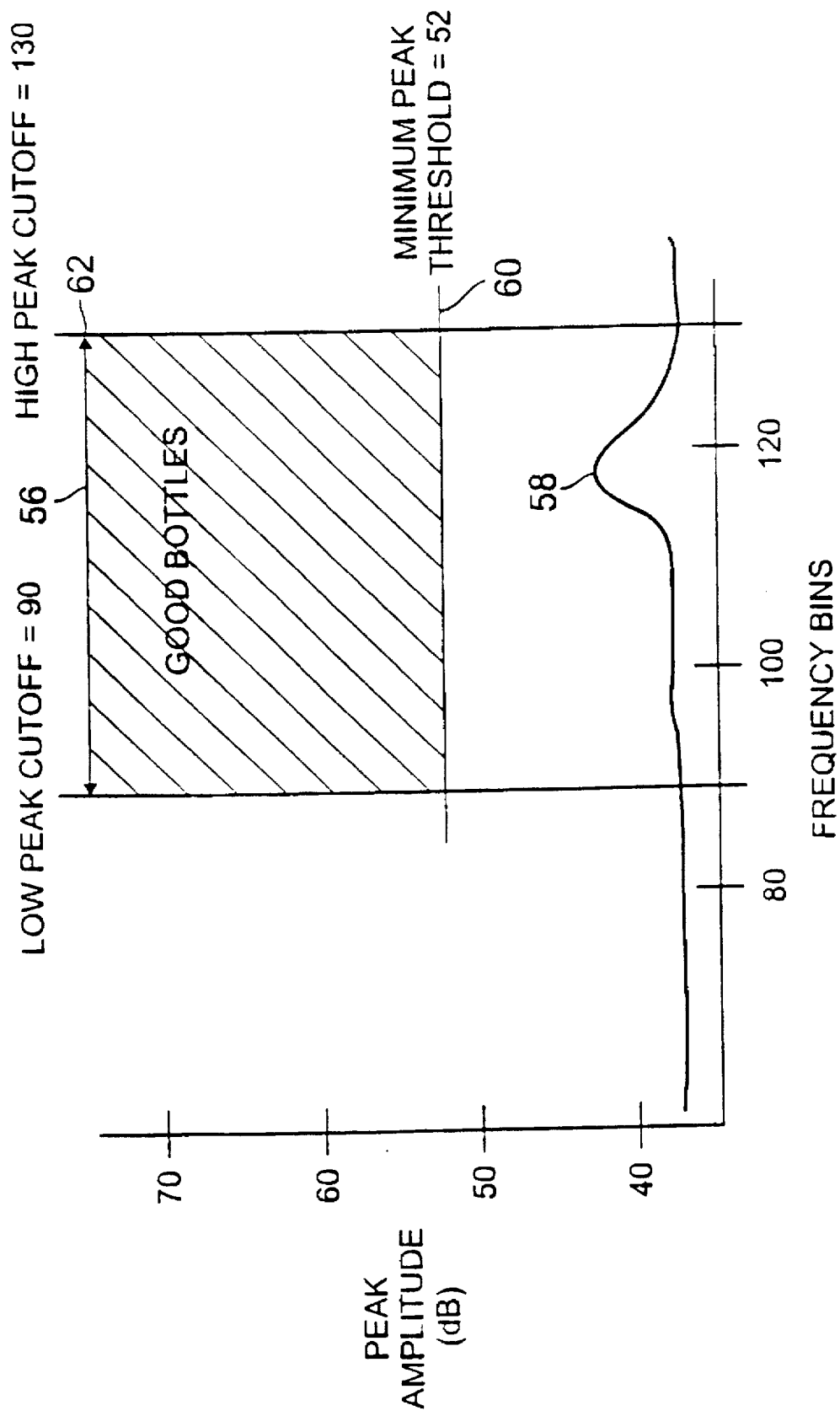
Figure 6A:
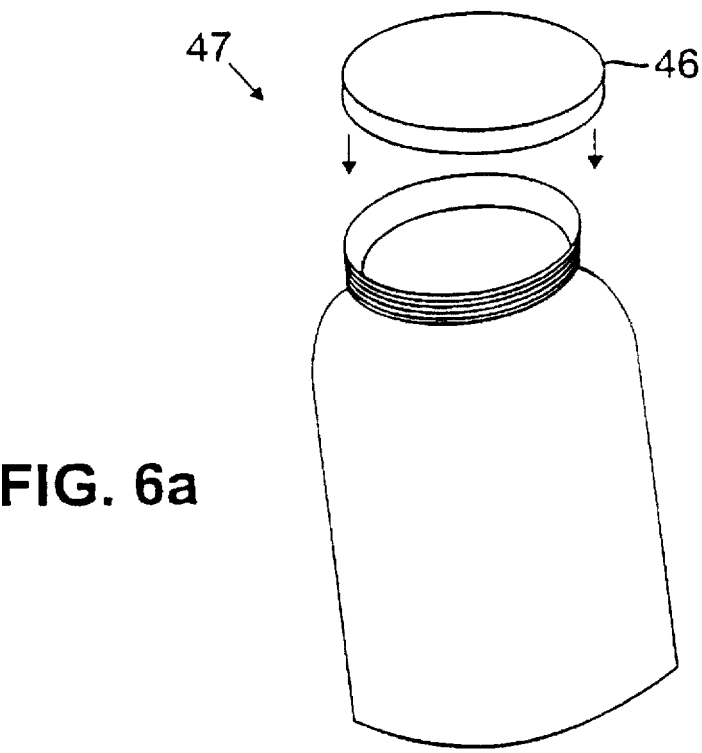
FIG. 6a is a perspective view of a pop top bottle.
Figure 6B:
FIGS. 6b and 6c are cross-sectional side views of a pop top bottle lid.
Figure 6C:

If the frequency of the peak is within a predetermined acceptable frequency range and the amplitude of the peak is above a predetermined minimum amplitude and below a predetermined maximum amplitude, then the container is determined to be properly pressurized/vacuumed and properly capped. For instance, referring to FIGS. 5a–5c, frequency domain signals are shown for vacuum-packed pop top bottles containing, for example, fruit juice. The lid 46 (FIGS. 6a–6c) of a pop top bottle 47 has a center portion that is cupped and flexible. When the bottle is properly filled and sealed, the curvature of the cup is concave 48 (FIG. 6c, i.e., in a down position) and the lid maintains a vacuum of approximately 15–30 psi within the bottle. Peak 50 (FIG. 5a), at about bin 108, represents a resonant frequency of a properly filled pop top bottle.

The cupped lid of a pop top bottle generally produces approximately the same resonant frequency whether it is in the concave 48 (FIG. 6c, down) or convex 52 (FIG. 6b, up) position. For example, peak 54 (FIG. 5b) represents the resonant frequency of a pop top bottle that is improperly filled but contains a sufficient vacuum to maintain the curvature of the lid in a concave (down) position. The lid of this bottle produces a reactant sound having a frequency peak which is outside a predetermined frequency range 56 of acceptable frequencies. Peak 58 (FIG. 5c) represents the reactant sound of a pop top bottle that contains little or no pressure and, thus, the curvature of the lid is in a convex (up) position. In this position, the lid produces a reactant sound having a frequency peak which is within acceptable frequency range 56 and would be accepted if frequency were the only criterion.

To correctly reject both pop top bottles associated with peaks 54 and 58 while accepting the pop top bottle associated with peak 50, the microprocessor analyzes both the frequency and the amplitude of the lid's reactant sound. The bottle associated with peak 50 is accepted because peak 50 is within the predetermined acceptable frequency range 56, above a predetermined minimum amplitude threshold 60, and below a predetermined maximum amplitude threshold 62. The bottles associated with peaks 54 and 58 are rejected because peak 54 is outside acceptable frequency range 56 and peak 58 is below minimum amplitude threshold 60.

Figure 8:
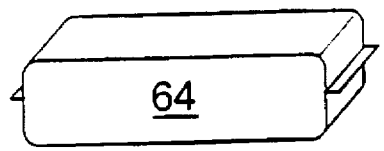
FIG. 8 is a perspective view of a vacuum packed foil bag.
Figure 7A:
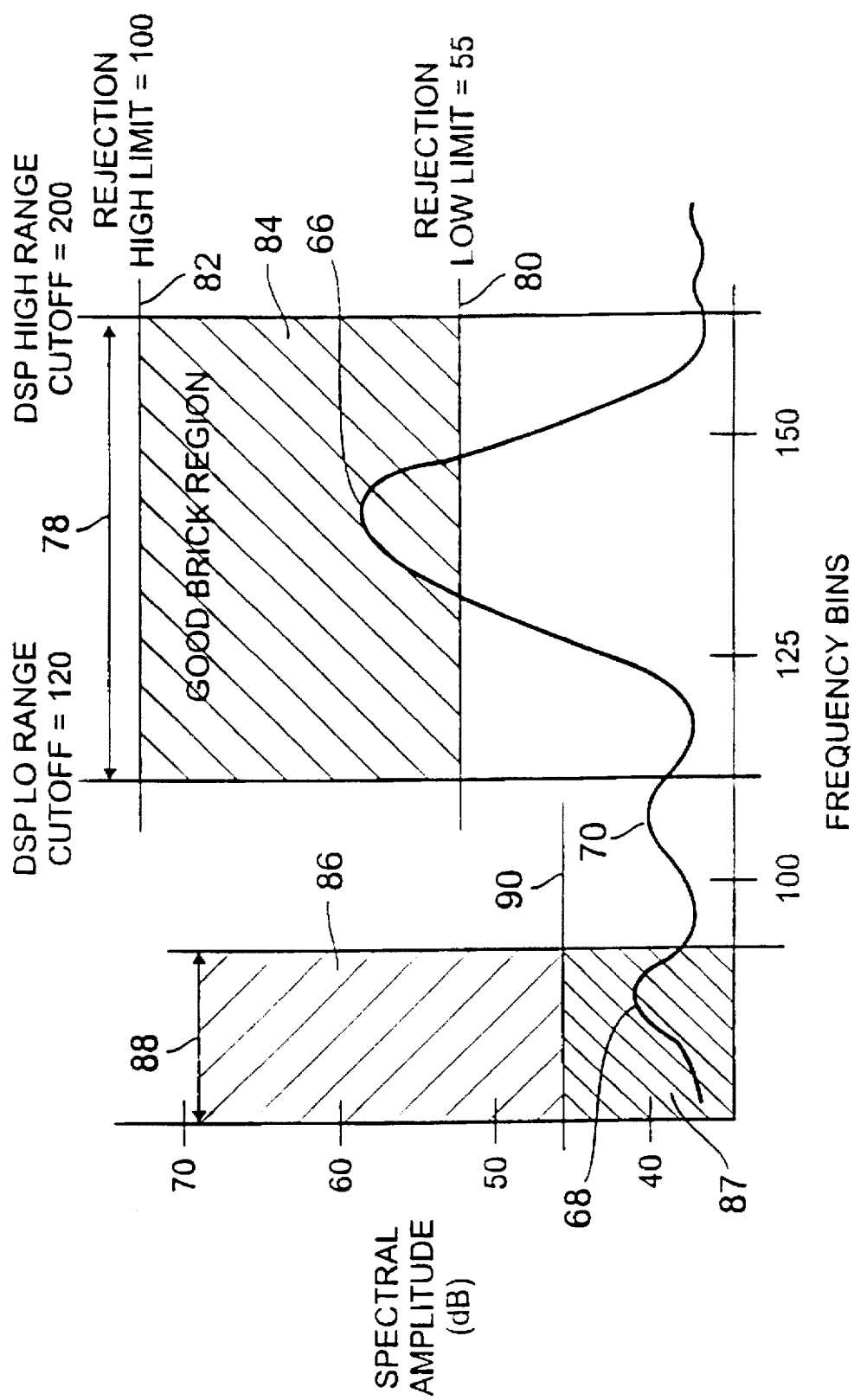
FIGS. 7a and 7b are frequency domain graphs of coffee brick acoustic responses for different internal vacuums.
Figure 7B:
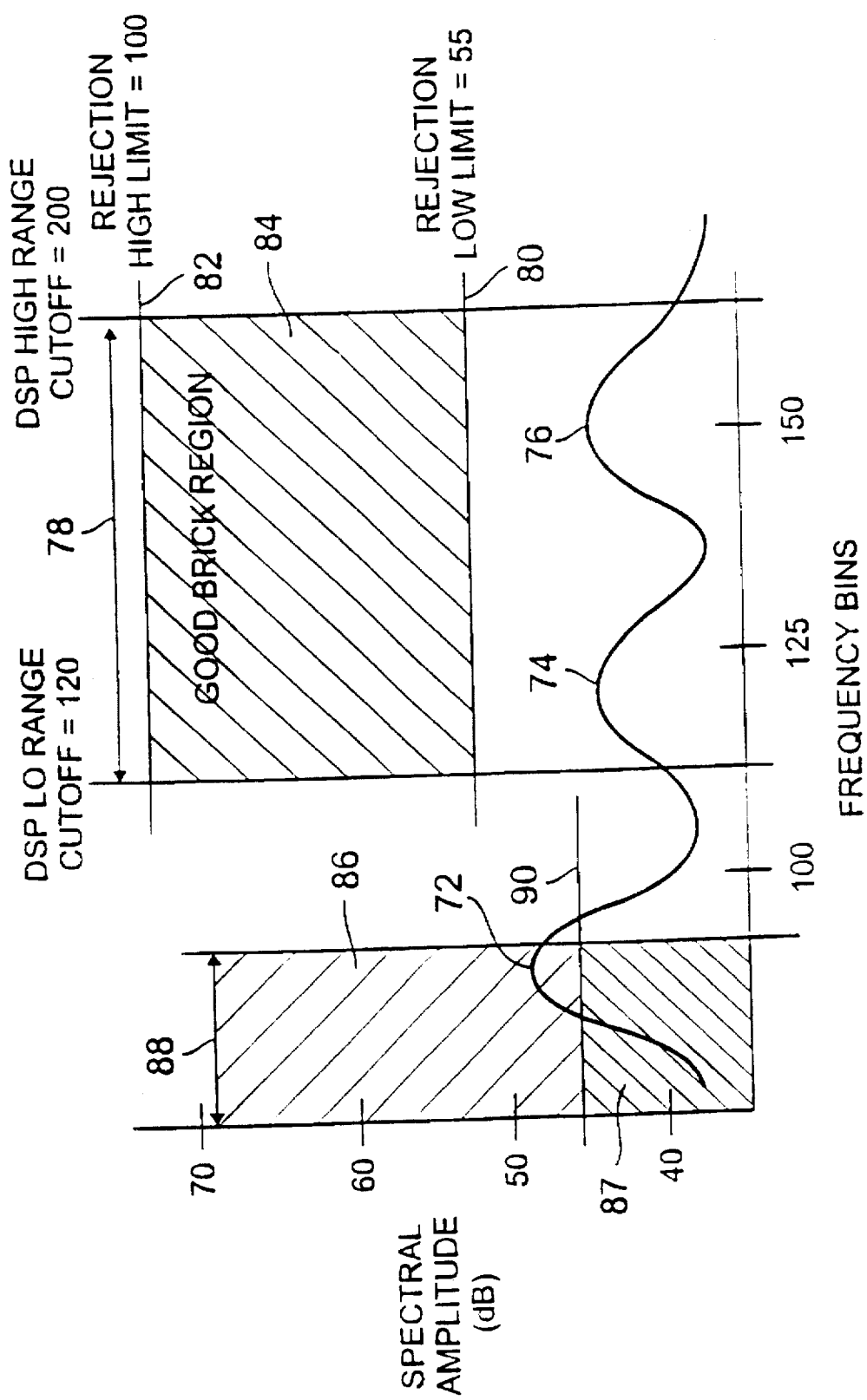

Referring to FIGS. 7a and 7b, power spectrums are shown for vacuum-packed bricks 64 (FIG. 8, e.g., coffee grounds vacuum packed in a rectangular foil bag). The package containing the coffee grounds is flexible and when the package is properly filled and sealed, it provides a hard surface and maintains a vacuum of approximately 100 mbar. Maximum peak 66, at about bin 130, represents the resonant frequency of a properly filled coffee brick.

Because the package is flexible, it generally produces multiple frequency peaks 66, 68, and 70. Peaks 72, 74, and 76 represent the reactant sound of an improperly filled (i.e., soft) brick. The controller correctly rejects the brick associated with peaks 72, 74, and 76 and correctly accepts the brick associated with peaks 66, 68, and 70 again by analyzing both the frequency and amplitude of the maximum frequency peak of the package's reactant sound to determine whether the brick is properly filled. The brick associated with peaks 66, 68, and 70 is accepted because maximum peak 66 is both within a predetermined acceptable frequency range 78, above a predetermined minimum amplitude threshold 80, and below a predetermined maximum amplitude threshold 82. The brick associated with peaks 72, 74, and 76 is rejected because peak 72 is outside the acceptable frequency range and peaks 74 and 76, which are within the acceptable frequency range, are below the minimum amplitude threshold 80.

Improperly filled bricks generally resonate at lower frequencies, e.g., peak 72, than properly filled bricks, e.g., peak 66. Therefore, instead of determining which bricks are properly sealed by looking for a frequency response within a good brick (container) region 84, the controller can determine which bricks are bad by looking for a frequency peak within a bad brick (container) region 86 above a good brick (container) region 87. For example, within a lower predetermined frequency range 88, a properly filled brick will not produce a reactant sound that includes a frequency peak above a predetermined minimum amplitude threshold 90. Thus, the microprocessor can reject every brick that produces a reactant sound having a frequency peak that is above the minimum amplitude threshold 90 within the frequency range 86.

Referring back to FIG. 2, after determining that a container is defective, the controller sends a signal to a rejector station 92 to cause the rejector station to remove the defective container from the manufacturing line. The rejector may be an actuator 94 including a piston with a bumper (not shown) positioned next to the conveyor belt to push improperly sealed containers 96 off the conveyor. Properly sealed containers 98 remain on the conveyor. The piston timing is accurately determined as a specific number of shaft encoder pulses after the container leaves the photobeam. Because the encoder accurately measures the speed of the conveyor belt, rejector errors due to changes in conveyor belt speed are minimized.

Referring again to FIG. 3, an operator may set the predetermined frequency range and the minimum and maximum amplitudes (i.e., set-up parameters) through a console 100 (FIG. 4) on controller 18. These values may be empirically determined by passing a series of properly and improperly pressurized/vacuumed containers through the inspection system and observing the resulting power spectrums corresponding to each container on a graphic display 102. The graphic display contains a plot of the power spectrum including the maximum peak's bin number and amplitude (dB). The set-up parameters may then be stored within the controller. After a variety of types of containers have been tested and their set-up parameters stored, operators may initialize the inspection system for each container type by selecting from a list of container types corresponding to previously stored set-up parameters.

Other embodiments are within the following claims.

What is claimed is:

1. A method comprising:
   inducing vibration in a surface of a closed container;
   detecting sound resulting from the vibration;
   deriving information representing the detected sound;
   determining whether a frequency component of the information corresponds to a predetermined spectral frequency condition, and
   determining whether an amplitude component of the information corresponds to a predetermined spectral amplitude condition.

2. The method of claim 1, wherein the surface is at least partially conductive and inducing includes:
   imposing a magnetic field on the surface.

3. The method of claim 1, wherein the step of determining includes comparing the information to the predetermined spectral frequency condition and the predetermined spectral amplitude condition.

4. The method of claim 1, wherein the predetermined spectral frequency condition corresponds to a range of acceptable values.

5. The method of claim 4, wherein the step of determining includes comparing the information to the range of acceptable values.

6. The method of claim 1, wherein the predetermined spectral amplitude condition corresponds to a range of acceptable values.

7. The method of claim 6, wherein the step of determining includes comparing the information to the range of acceptable values.

8. The method of claim 1, wherein the information comprises digital data.

9. The method of claim 1, wherein the information represents a frequency spectrum peak.

10. The method of claim 1 wherein the predetermined spectral frequency condition and the predetermined spectral amplitude condition define a good container region.

11. The method of claim 10, wherein determining includes comparing the frequency and the amplitude of a spectral frequency peak to the good container region.

12. The method of claim 1 wherein the predetermined spectral frequency condition and the predetermined spectral amplitude condition define a bad container region.

13. The method of claim 12, wherein determining includes comparing the frequency and amplitude of a spectral frequency peak to the bad container region.

14. The method of claim 1, wherein the detected sound is used to determine whether the closed container contains a pressure level within a predetermined range of pressure levels.

15. A method comprising:
   inducing vibration in a surface of a closed container by imposing a magnetic field on the surface;
   detecting sound resulting from the vibration;
   deriving information representing the detected sound;
   determining whether a frequency component of the information corresponds to a predetermined frequency condition, wherein the predetermined frequency condition corresponds to a range of acceptable frequencies, including
      comparing the information to the range of acceptable frequencies, and
   determining whether an amplitude component of the information corresponds to a predetermined amplitude condition, wherein the predetermined amplitude condition corresponds to a minimum or a maximum amplitude threshold, including
comparing the information to the amplitude thresholds.

16. A method of operating a manufacturing line, comprising:

passing closed containers through a container inspection system, at the container inspection system:

inducing vibration in a surface of each of the closed containers;

detecting sound resulting from the vibration;

deriving information representing the detected sound;

determining whether a frequency component of the information corresponds to a predetermined spectral frequency condition, and determining whether an amplitude component of the information corresponds to a predetermined spectral amplitude condition.

17. The method of claim 16, wherein the step of inducing includes:

imposing a magnetic field on the surface of each of the closed containers.

18. The method of claim 16, wherein the step of determining includes comparing the information to the predetermined spectral frequency condition and the predetermined spectral amplitude condition.

19. The method of claim 16, wherein the information represents a spectral frequency peak.

20. The method of claim 16, wherein the predetermined spectral frequency condition and the predetermined spectral amplitude condition define a good container region.

21. The method of claim 20, wherein determining includes comparing the frequency and the amplitude of a spectral frequency peak to the good container region.

22. The method of claim 21 further comprising:

rejecting containers with associated frequency peaks that are outside the good container region; and
accepting containers with associated frequency peaks that are within the good container region.

23. The method of claim 16, further comprising:

rejecting and accepting respective containers based on the results of the determining step.

24. The method of claim 23, wherein rejecting includes rejecting containers with associated spectral frequency peaks that are outside a range of acceptable frequencies and rejecting containers with associated spectral frequency peaks that are within a range of acceptable frequencies and have amplitudes below a minimum amplitude threshold or above a maximum amplitude threshold.

25. The method of claim 23, wherein rejected containers contain a pressure level below a predetermined range of acceptable pressure levels.

26. The method of claim 16, wherein the predetermined spectral frequency condition and the predetermined spectral amplitude condition define a bad container region.

27. The method of claim 26, wherein determining includes comparing the frequency and the amplitude of a spectral frequency peak to the bad container region.

28. The method of claim 27 further comprising:

rejecting containers with associated spectral frequency peaks that are within the bad container region; and accepting containers with associated spectral frequency peaks that are outside the bad container region.

29. The method of claim 28, wherein rejecting includes rejecting containers with associated spectral frequency peaks that are within a predetermined range of acceptable frequencies and have amplitudes above a minimum amplitude threshold or below a maximum amplitude threshold.

30. The method of claim 28, wherein rejected containers contain a pressure level below a predetermined range of acceptable pressure levels.

* * * * *